United States Patent [19]

Dixon et al.

[11] 4,137,280

[45] Jan. 30, 1979

[54] POLYALKYLENE CARBONATES AS PROCESSING AIDS FOR POLYVINYL CHLORIDE

[75] Inventors: Dale D. Dixon, Kutztown; Michael E. Ford, Trexlertown, both of Pa.

[73] Assignee: Air Products and Chemicals, Inc., Allentown, Pa.

[21] Appl. No.: 897,627

[22] Filed: Apr. 19, 1978

[51] Int. Cl.$^2$ .............................................. C08L 69/00
[52] U.S. Cl. ....................................... 260/873; 528/370; 528/405
[58] Field of Search ............... 260/873, 2 BP, 47 XA; 528/405

[56] References Cited

U.S. PATENT DOCUMENTS

| 3,305,605 | 2/1967 | Hostettler et al. | 260/873 |
| 3,585,168 | 6/1971 | Inoue et al. | 528/371 |
| 3,629,170 | 12/1971 | Yamanouchi et al. | 260/23 XA |
| 3,900,424 | 8/1975 | Inoue et al. | 252/428 |
| 3,953,383 | 4/1976 | Inoue et al. | 260/2 BP |
| 4,066,630 | 1/1978 | Dixon et al. | 528/69 |

Primary Examiner—Thomas De Benedictis, Sr.
Attorney, Agent, or Firm—Russell L. Brewer; Barry Moyerman

[57] ABSTRACT

This invention relates to a polyvinyl chloride composition having blended therein from about 5-60% of a polyalkylene carbonate formed by reacting an alkylene oxide and carbon dioxide. The polyalkylene carbonate is added to improve the melt flow indices and oxygen barrier characteristics of the polyvinyl chloride.

7 Claims, No Drawings

POLYALKYLENE CARBONATES AS PROCESSING AIDS FOR POLYVINYL CHLORIDE

BACKGROUND OF THE INVENTION

1. Field of the Invention

This invention relates to polyvinyl chloride compositions suited for molding and producing film which has improved melt flow and oxygen barrier properties.

2. Description of the Prior Art

Polyvinyl chloride has been widely used as a resin for many molding and coating applications. Some of the difficulties with vinyl chloride resin are associated with its high processing temperature and low thermal stability at the processing temperature. One method for increasing the melt flow of polyvinyl chloride has been to include a chain transfer agent into the polymerization reaction to reduce the molecular weight of the vinyl chloride polymer. In some cases this has been quite acceptable. Another method has been to incorporate processing acids into the polyvinyl chloride resin to improve its melt flow, thermal stability, and resistance to ultra-violet light, etc. Specific developments in the art are shown in the following patents:

U.S. Pat. No. 3,305,605, which discloses the use of cyclic carbonates having a molecular weight of from about 15,000 to 1,000,000 as a plasticizer for vinyl chloride. An example of a polycarbonate is dioxacyclohexanone.

U.S. Pat. No. 3,882,192 discloses the use of an aromatic polycarbonate in combination with an ABS graft polymer, and vinyl acetate-ethylene copolymer or styrene-maleic copolymer as a processing aid for polyvinyl chloride polymer systems. The polycarbonates were used in the polyvinyl chloride composition to improve the thermal stability of the polymer to permit processing at higher temperatures.

U.S. Pat. No. 2,807,603 discloses a vinyl chloride polymer composition having excellent physical properties including high impact strength and shock resistance. It is obtained by including a styrene-acrylonitrile copolymer as a processing aid.

U.S. Pat. No. 3,629,170 discloses a vinyl chloride polymer composition which includes an aromatic polysulfonic resin for the purpose of providing improved impact strength and thermal stability.

U.S. Pat. No. 3,760,035 discloses a vinyl chloride resin having improved impact strength and utilizes an insoluble alkyl acrylate polymer as a blending agent.

SUMMARY OF THE INVENTION

This invention relates to a vinyl chloride polymeric composition having improved oxygen barrier characteristics as well as an improved melt flow index. The polymeric composition comprises a substantially uniform blend of a vinyl chloride containing polymer having at least 50% vinyl chloride polymerized therein, and from about 5–60% by weight of a polyalkylene carbonate, the polyalkylene carbonate being formed by reacting an alkylene oxide and carbon dioxide.

Several advantages are obtained when combining the polyalkylene carbonate with the polyvinyl chloride, and these include:

a polymeric composition suited for molding which has increased oxygen barrier characteristics as opposed to polyvinyl chloride resins by themselves or blended with aromatic polycarbonates;

a polymer having higher melt index or melt flow at a given temperature thus improving processability; and a stable polymeric composition in terms of blend stabilization.

DESCRIPTION OF THE PREFERRED EMBODIMENTS

The polycarbonates suited for blending with vinyl chloride and polymer compositions are those which are normally solid at room temperature (75° F.) and atmosphere pressure. They are formed by reacting an alkylene oxide and carbon dioxide in the presence of a catalyst to form a polymer having alternating units of alkylene oxide and carbon dioxide. The formula below represents the repeating structure of the polymer.

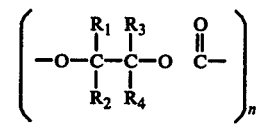

wherein:

$R_1$ is a hydrogen atom or hydrocarbyl group having from 1–6 carbon atoms;

$R_3$ is hydrogen or hydrocarbyl having from 1–6 carbon atoms;

$R_2$ and $R_4$ are hydrogen or hydrocarbyl having from 1–6 carbon atoms; and n is an integer from 250–6500.

Generally, n in the formula will range from 250 at the low side to 1500 at the high side. Typically, the number of repeating units is from about 500–1500 to provide a polymer having a molecular weight of from about 75,000–150,000.

Several methods for forming the polyalkylene carbonates suited for blending with the vinyl chloride resins are disclosed in U.S. Pat. Nos. 3,585,168; 3,900,424 and 3,953,383 and are incorporated by reference.

The polyalkylene carbonates formed by any of the processes disclosed in the previous patents mentioned above are hydroxyl terminated. In our copending applications, U.S. Ser. No. 838,810 filed Oct. 3, 1977, U.S. Ser. No. 794,263 filed May 5, 1977, now U.S Pat. No. 4,104,264 and U.S. Pat. No. 4,066,630, it has been disclosed that the thermal stability of the polyalkylene carbonate can be improved by end-capping the hydroxyl group to form an oxygen-carbon bond, an oxygen-phosphorus bond, and an oxygen-sulfur bond. End-capping is accomplished by reacting the hydroxyl group with the hydroxyl reactive organic compound, sulfur compound or phosphorus compound, and examples include methyliodide, sulfonyl chloride, and phosphorus trichloride. Procedures for the end-capping of the hydroxyl terminated polyalkylene carbonate resins are incorporated by reference.

The polymeric vinyl chloride resins suited for blending with the polyalkylene carbonates are polyvinyl chloride homopolymer, polyvinyl chloride copolymers such as vinyl chloride-vinyl acetate copolymers where the vinyl acetate content is from about 5–15% by weight; vinyl chloride-vinylidene chloride, vinyl chloride-acrylonitrile, and so forth. Primarily, polyvinyl chloride is used as the other component in forming the blend as it is compatible with the polyalkylene carbonate to form a desirable molding composition.

The proportion of polyalkylene carbonate in the vinyl chloride polymer blend generally ranges from about 5–60% by weight, and preferably is in a range of from about 15 to 30% by weight. When the proportion of polyalkylene carbonate falls below about 5% by weight, there is generally insufficient processing aid available to significantly enhance the processing characteristics of the vinyl chloride polymer. This is evidenced by a slight change in the melt flow indices. On the other hand, as the proportion of polyalkylene carbonate is increased above about 60% by weight, then the polymeric composition loses its overall benefit as a molding compound i.e. toughness primarily because of the reduced quantity of vinyl chloride polymer being available. In a preferred embodiment, we found that a proportion of from about 15 to 30% polyalkylene carbonate provides desirable physical properties and there is a sufficient amount of polyalkylene carbonate present to desirably increase the oxygen barrier characteristics of the polymer to form barrier films and coatings.

The blends or molding compositions can be prepared by conventional techniques, e.g., by solution blending or melt blending. If solution blending is used, a suitable inert organic solvent, e.g., a chlorinated hydrocarbon such as methylene chloride, chloroform, or chlorobenzene, can be used to dissolve the vinyl chloride polymer and the polyalkylene carbonate in desired proportion, then blended and the solvent removed by distillation or by coprecipitation with a non-solvent. Generally, the polymers are prepared by melt/mixing the components. For this purpose, the components may be melted together, mixed and extruded, e.g., in extruders fitted with mixing devices or the polymers may be melted separately and extruded together, or melted separately and then mixed with each other prior to extrusion.

Optionally, conventional stabilizers e.g. heat and UV and processing agents can be added to the blend for their desired purpose.

The following examples are provided to illustrate preferred embodiments in the invention and are not intended to restrict the scope thereof. All temperatures are in degrees centigrade, and all percentages are expressed as weight percentages.

EXAMPLE 1 (CONTROL)

A polyvinyl chloride molding composition was prepared by blending 100 weight parts of the polyvinyl chloride having an I.V. (Inherent Viscosity) of 9.2, 2 parts of a tin stabilizer, more particularly di-(n-octyl) tin S, S'-bis(isooctylmercaptoacetate), 3 parts of a plasticizer consisting of an epoxidized soybean oil, 0.75 parts of a methylmethacrylate polymeric composition for enhancing flowability, and 0.75 parts glycerol monostearate in a Brabender mixer at 190° C. until the mixture was homogenous.

EXAMPLE 2

Three polyvinyl chloride test compositions were prepared with various quantities of polyethylene carbonate having an average molecular weight of 100,000 and a melting point of 190°–200° C. The polymer was prepared in accordance with the procedure of Example 1 in U.S. Pat. No. 3,900,424. The formulations remained the same as in Example 1, except that the polyvinyl chloride concentration and various stabilizers in processing agents were reduced by the percentage of polyalkylene carbonate added to the formulation.

Sample A consisted of 90 parts polyvinyl chloride, 10 parts polyethylene carbonate, 1.8 parts tin stabilizer, 2.7 parts epoxidized soybean oil, 0.68 parts polymethylmethacrylate and 0.68 parts glycerol monostearate.

Sample B consisted of 80 parts polyvinyl chloride, 20 parts polyethylene carbonate, 1.6 parts tin stabilizer, 2.4 parts epoxidized soybean oil, 0.6 parts polymethylmethacrylate, and 0.6 parts glycerol monostrearate.

Sample C consisted of 60 parts polyvinyl chloride, 40 parts polyethylene carbonate, 1.2 parts tin stabilizer, 1.8 parts epoxidized soybean oil, 0.45 parts polymethylmethacrylate, and 0.45 parts glycerol monostearate.

EXAMPLE 3

The uniform blends of polyvinyl chloride molding compositions represented in Examples 1 and Samples A, B and C in Example 2 were tested specifically for the melt flow indices according to ASTM Procedure D 1238-62T, oxygen transmission according to ASTM Procedure D 1434, Izod impact strength as determined by ASTM Procedure D 256-73 and dielectric constant as determined by ASTM Procedure D 150. The results are presented in Table 1 below.

TABLE 1

| EXAMPLE | MELT FLOW* (grams/10 min.) | OXYGEN TRANSMISSION** (cc/24 hr./100"$^2$/ atmos. 75° F) | | IZOD IMPACT | DIELECTRIC CONSTANT |
|---|---|---|---|---|---|
| | | ASTM | Modern Control | | |
| 1 | 1 | 11 | — | 0.4 | 3.3–3.4 |
| Sample A | 2.0 | 11 11 mil film | 3.5–3.6 25 mil film | 0.5 | 2.8–3.0 |
| Sample B | 7.1 | 5–6 15 mil film | 2.9–4.0 25 mil film | 0.4 | 3.1–3.2 |
| Sample C | 43.8 | 5 11 mil film | 2.3–2.7 22 mil film | 0.4 | 3.1 |

*Melt Flow Extruder was operated at 190° C and the pressure was 21,600 grams.
**Oxygen transmission ASTM D1434.

The results in Table 1 show that the melt flow increased substantially for those blends containing increased quantities of polyethylene carbonate. Where the concentration of polyethylene carbonate exceeded 10% by weight, three fold increase in melt flow was observed between 10 and 20% and a six fold increase was observed between 20 and 40%. Additionally, the resistance to oxygen transmission was about twice that of the polyvinyl chloride homopolymer itself at a 10 to 15 mil film thickness. On the other hand, the addition of polyethylene carbonate to the polyvinyl chloride composition did not detract from the impact strength or alter the dielectric constant of the blend.

In contrast, blends of aromatic polycarbonates and polyvinyl chloride, coupled with the addition of an ABS graft polymer as reported in U.S. Pat. No. 3,882,192 show an increase in thermal stability and impact strength whereas the melt flow characteristics are not significantly better. Thus, the aromatic polycarbonates are not processing aids for polyvinyl chloride homopolymer.

What is claimed is:

1. A polymeric composition which comprises a uniform blend of a vinyl chloride polymer containing at least 50% vinyl chloride, and from about 5-60% by weight of said blend of a polyalkylene carbonate formed by reacting an alkylene oxide and carbon dioxide having a repeating unit of the formula:

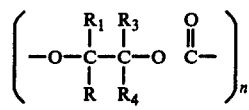

wherein:
$R_1$ is a hydrogen atom or hydrocarbyl group having from 1-6 carbon atoms;
$R_3$ is hydrogen or hydrocarbyl having from 1-6 carbon atoms;
$R_2$ and $R_4$ are hydrogen or hydrocarbyl having from 1-6 carbon atoms; and
n is an interger from 250-6500.

2. The composition of claim 1 wherein the proportion of vinyl chloride in said vinyl chloride containing polymer is at least 85% by weight.

3. The composition of claim 2 wherein said polyalkylene carbonate is included in a proportion of from 10-40% by weight.

4. The composition of claim 3 wherein n is an integer from about 500-1500.

5. The composition of claim 4 wherein $R_2$ and $R_4$ are hydrogen.

6. The composition of claim 5 wherein $R_1$ and $R_3$ are hydrogen.

7. The composition of claim 6 wherein vinyl chloride containing polymer is a vinyl chloride homopolymer.

* * * * *